G. W. JONES & F. C. WILKES.
Churns.
No. 156,357. Patented Oct. 27, 1874.
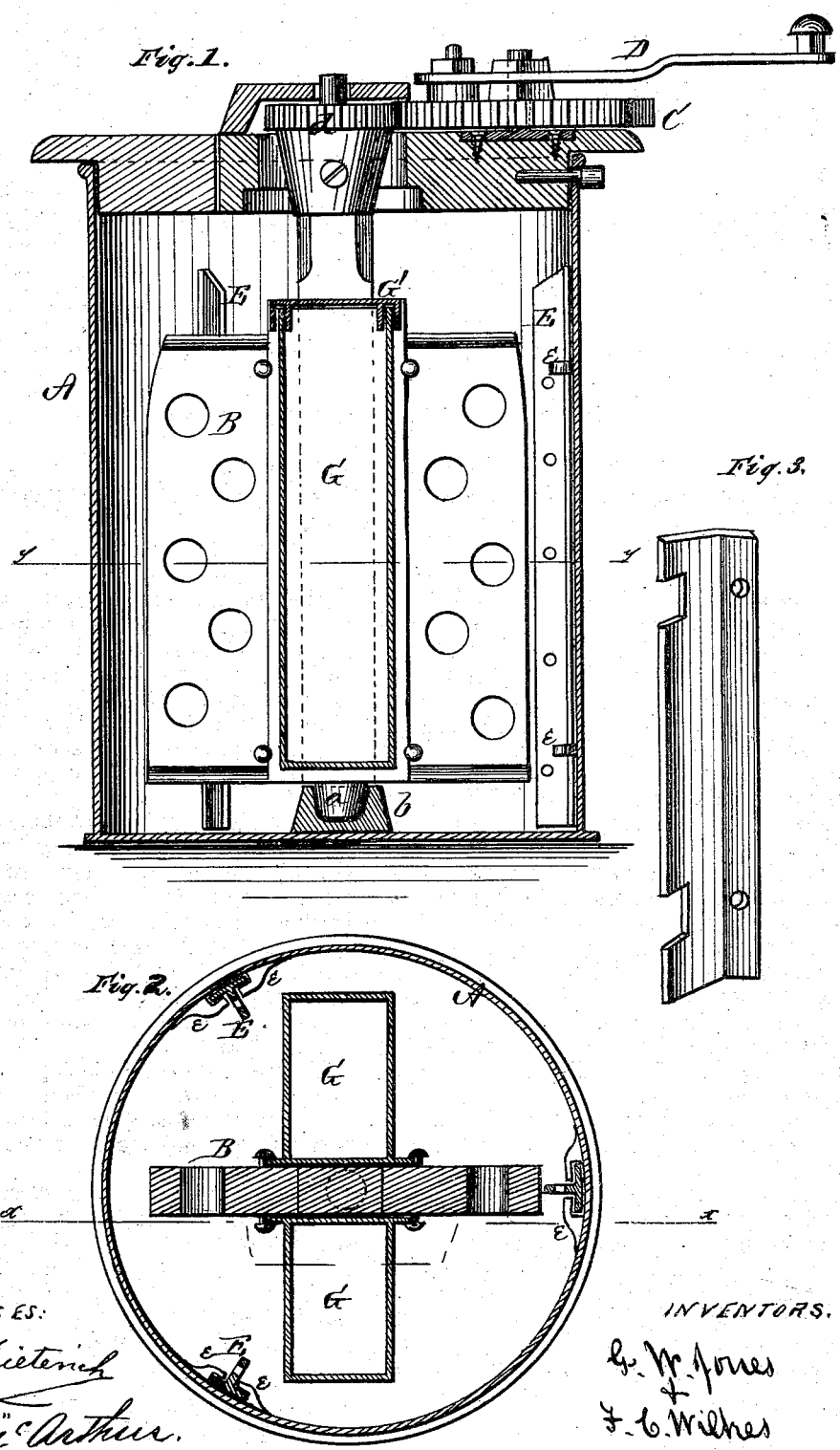

UNITED STATES PATENT OFFICE.

GEORGE W. JONES AND FRANKLIN C. WILKES, OF CULLEOKA, TENNESSEE.

IMPROVEMENT IN CHURNS.

Specification forming part of Letters Patent No. 156,357, dated October 27, 1874; application filed June 23, 1874.

*To all whom it may concern:*

Be it known that we, GEORGE W. JONES and FRANKLIN C. WILKES, of Culleoka, in the county of Maury and State of Tennessee, have invented certain new and useful Improvements in Churns; and we do hereby declare that the following is a full, clear, and exact description thereof, reference being had to the accompanying drawings, and to the letters of reference marked thereon, which form part of this specification.

The nature of our invention consists in the construction and arrangement of a churn, as will be hereinafter more fully set forth.

In the accompanying drawing, Figure 1 is a longitudinal vertical section of our churn through the line $x\ x$, Fig. 2. Fig. 2 is a horizontal section through the line $y\ y$, Fig. 2.

A represents the churn, made of tin or other suitable material, in cylindrical form, and of any desired dimensions. B is the dasher, consisting of a paddle made of a single piece of wood, having a journal, $a$, formed in the center at its lower end to rest in a step, $b$, in the bottom of the churn. The dasher B is made to revolve by means of a pinion, $d$, on the upper end of the shaft geared with a driving-wheel, C, to which is attached a rotating crank, D. Inside of the churn A are three vertical perforated flanges, E, made in T-shape, and placed in guides $e\ e$, so as to be taken out and replaced, as desired. To the sides of the dashing-paddle B, and opposite each other, are two boxes, G G, of tin or other suitable material, which boxes are open at top, but capable of being closed by proper caps or covers G′, so as to be water-tight. These boxes are of any convenient length and thickness, and broad enough to revolve with the dasher, of which it is a part, by dovetail fastenings or otherwise.

When the milk is to be churned, if it be too cold the boxes G are filled with hot water, slipped into the fastenings, and the work proceeds. If the milk be too warm the boxes are filled with cold water or ice, and the work proceeds. If the milk is of proper temperature the boxes may be left off or used empty.

Having thus fully described our invention, what we claim as new, and desire to secure by Letters Patent, is—

The removable regulating-boxes G G, attached to the revolving dasher B, in combination with the T-shaped flanges E E, all constructed and arranged substantially as described.

In testimony that we claim the foregoing as our own we affix our signatures in presence of two witnesses.

G. W. JONES.
F. C. WILKES.

Witnesses:
W. K. STEPHENS,
J. B. CLARK.